→ Pressure (Nos 1,6,7,10,8,1)
--→ Exhaust (Nos 1,7,1)
—→ Neutral (Nos 1,6,1)

Inventor
Karl-Heinz Liebert
by [signature]
Attorney

Oct. 7, 1969 KARL-HEINZ LIEBERT 3,470,758

POWER STEERING SYSTEM

Filed Jan. 17, 1968 8 Sheets-Sheet 3

Inventor
Karl-Heinz Liebert by *Attorney*

Oct. 7, 1969   KARL-HEINZ LIEBERT   3,470,758
POWER STEERING SYSTEM
Filed Jan. 17, 1968   8 Sheets-Sheet 8

Inventor
Karl-Heinz Liebert
by *Attorney*

3,470,758
POWER STEERING SYSTEM
Karl-Heinz Liebert, Schwabisch Gmund, Germany, assignor to Zahnradfabrik Friedrichshafen, Aktiengesellschaft, Friedrichshafen, Germany, a corporation of Germany
Filed Jan. 17, 1968, Ser. No. 698,625
Int. Cl. F16h 35/00
U.S. Cl. 74—388    19 Claims

ABSTRACT OF THE DISCLOSURE

The present invention pertains directly to the use of a mechanism in a power steering system wherein a metering pump is actuated at a relatively high speed by manual force on the steering spindle rotating at a relatively low speed so as to increase the efficiency and output of the metering pump without increasing its size. Also, the metering pump augments the pressure in the system.

---

Briefly, the invention contemplates a construction wherein a single housing contains a positive flow gear pump i.e., a metering pump, and a drive means which consists of a shaft having a cam which effects a crank arm coaction for rotation of the shaft, by manual power of the steering spindle. More specifically, the cam is a disc carried within a gear pinion and concentric therewith, which pinion is disposed in mesh inside an internal gear that is rotated by the steering spindle. Accordingly, the metering pump which comprises a central gear and two side gears, wherein the central gear is driven by the aforementioned shaft, will have a speed in proportion to a ratio which is equal to the number of teeth of the internal gear divided by the difference between the number of teeth of the internal gear and the pinion therein. This arrangement can produce a much higher rotational rate for the metering pump than is achieved by direct connection to the steering spindle.

Further, the rotation of the steering spindle effects actuation of a rotary valve built within the housing while simultaneously actuating the metering pump. Such rotary valve controls flow from the engine driven pump system and the metering pump to a double ended servo motor for effecting power steering. The valve includes a first part fixed to the housing and a second part adapted to effect only a limited movement with respect to said first valve part, thus causing less wear of both valve parts than the known valve arrangements.

Figure 1:
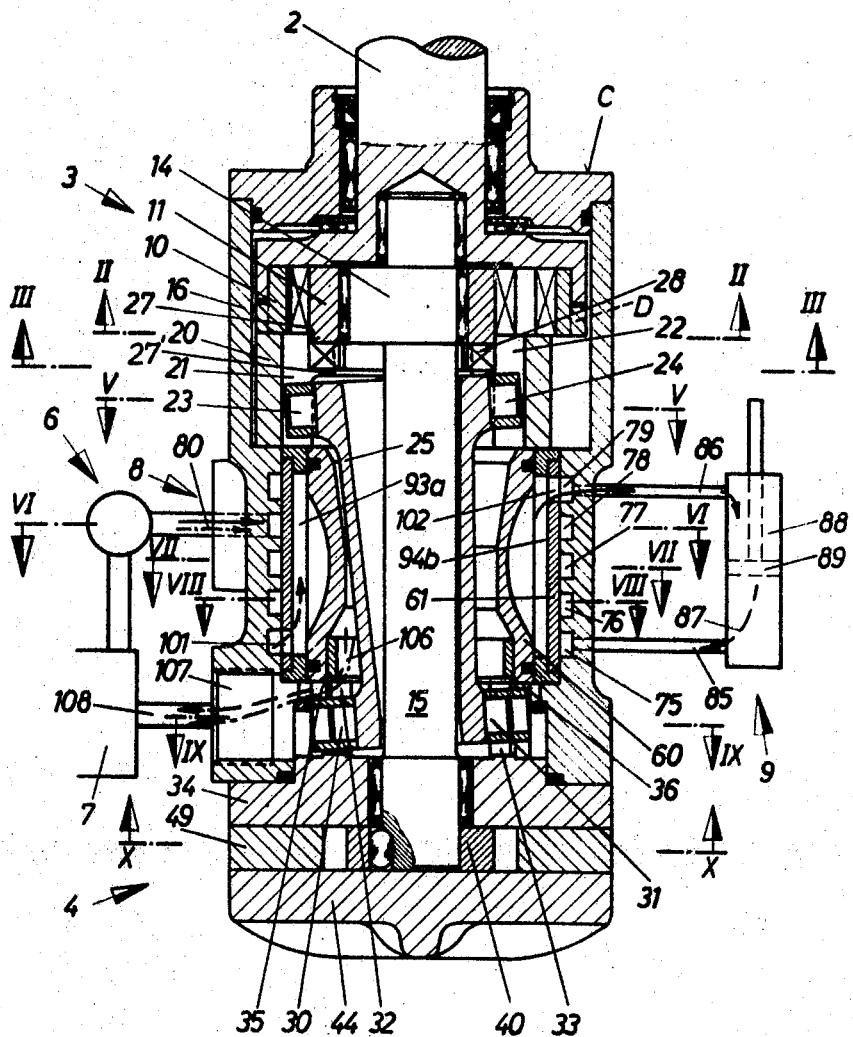
Figure 2:
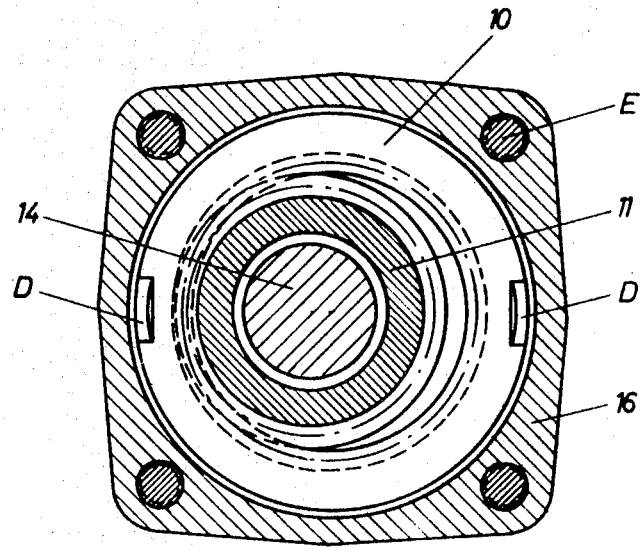
Figure 3:
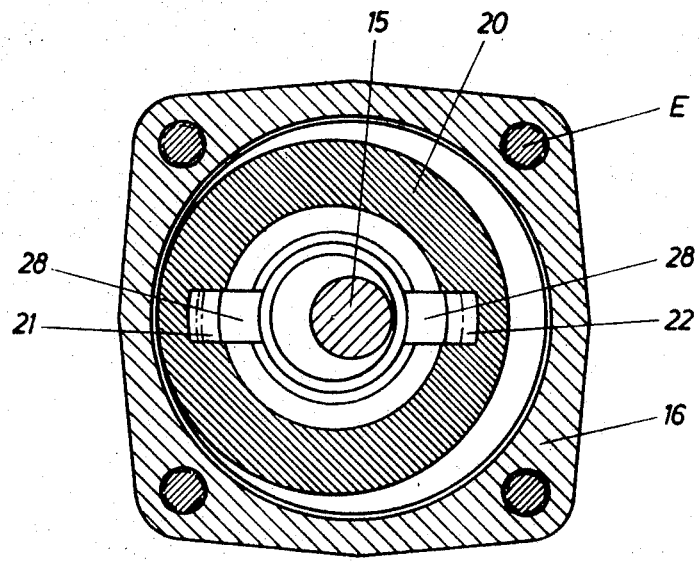
Figure 4:
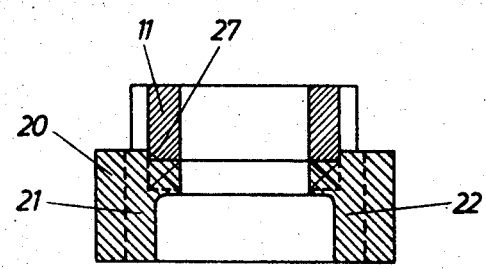
Figure 5:
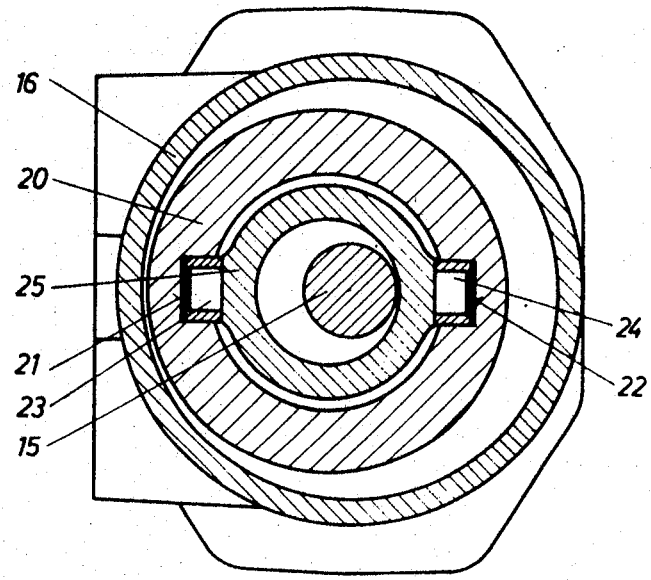
Figure 6:
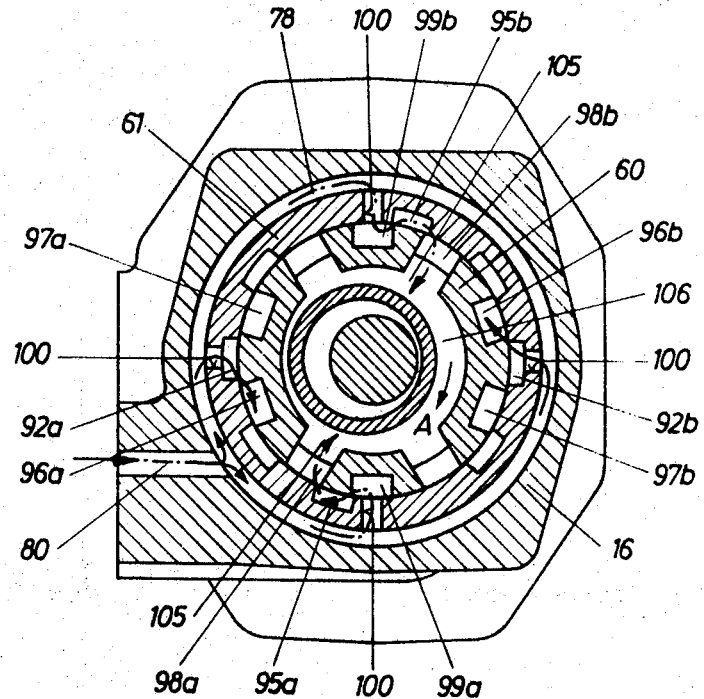
Figure 7:
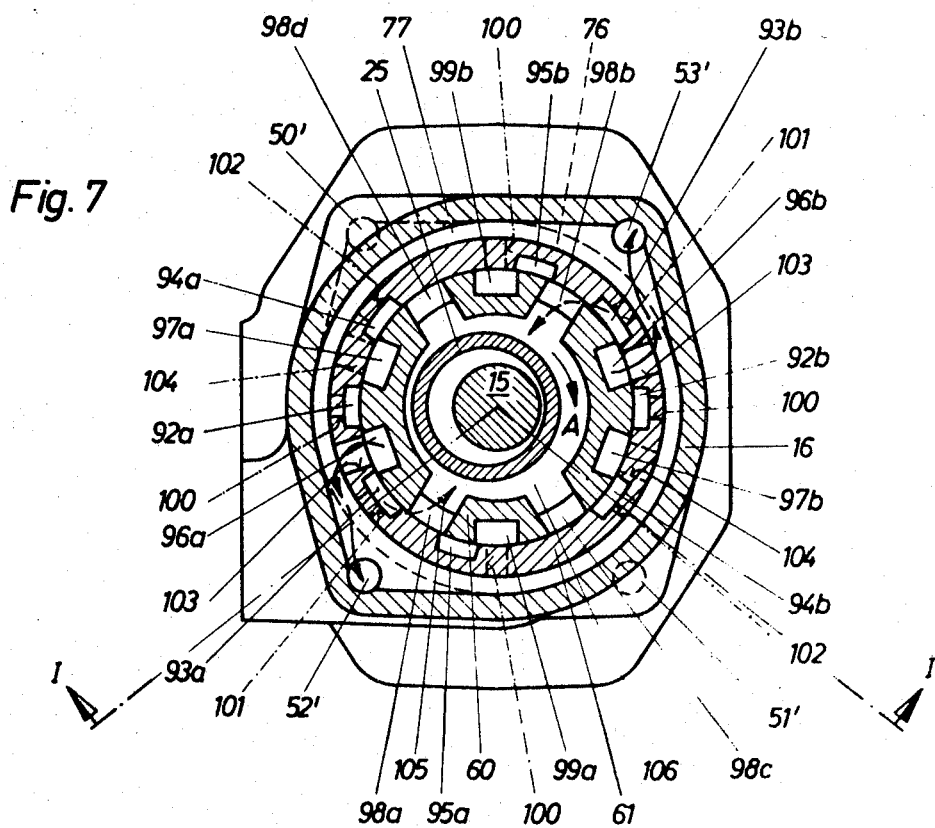
Figure 8:
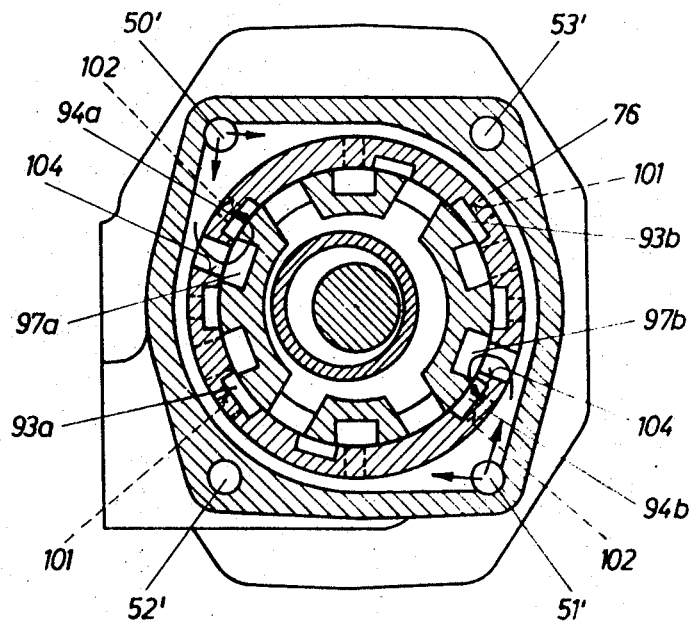
Figure 9:
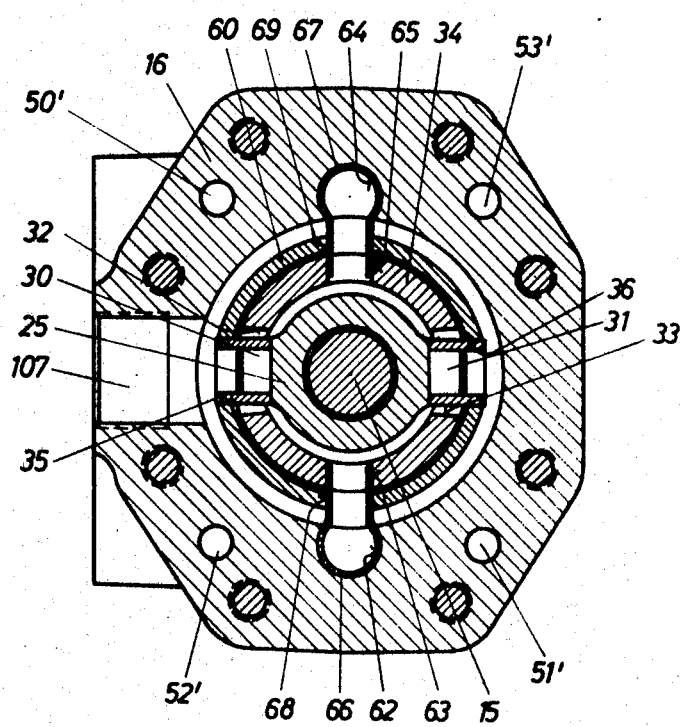
Figure 10:
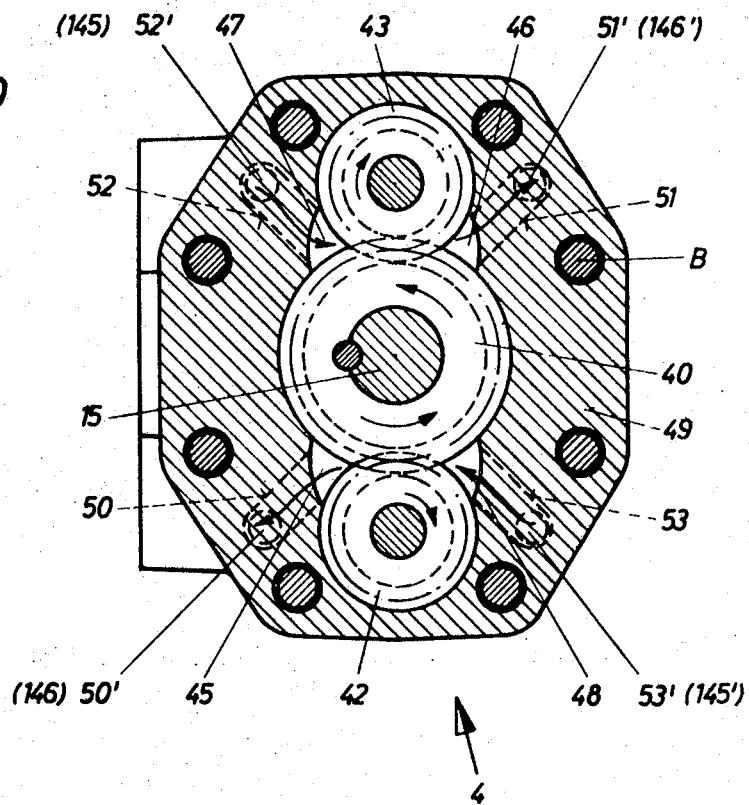
Figure 11:
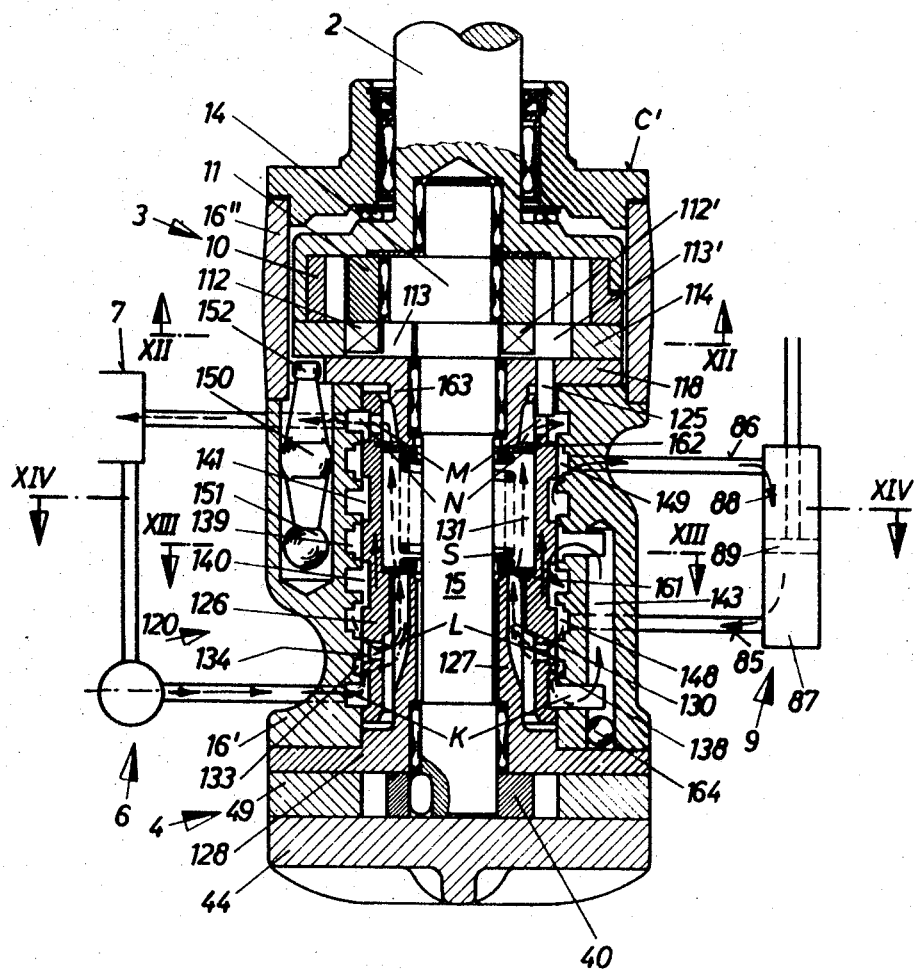
Figure 12:
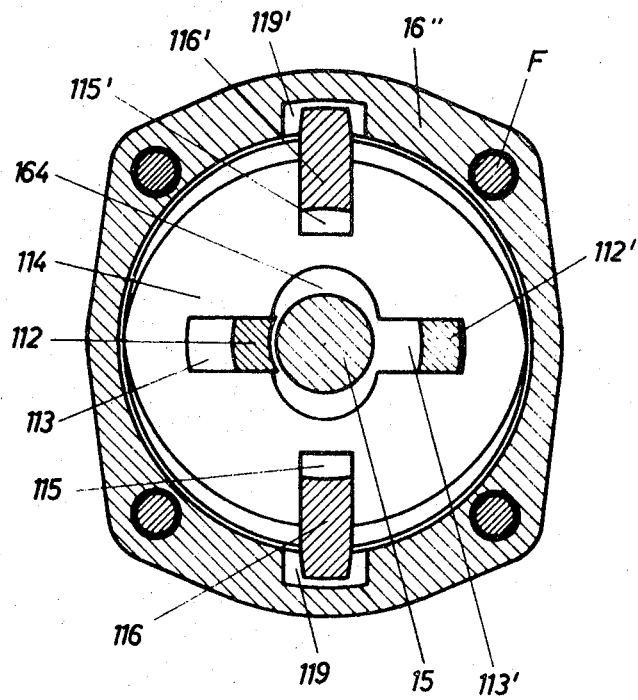
Figure 13:
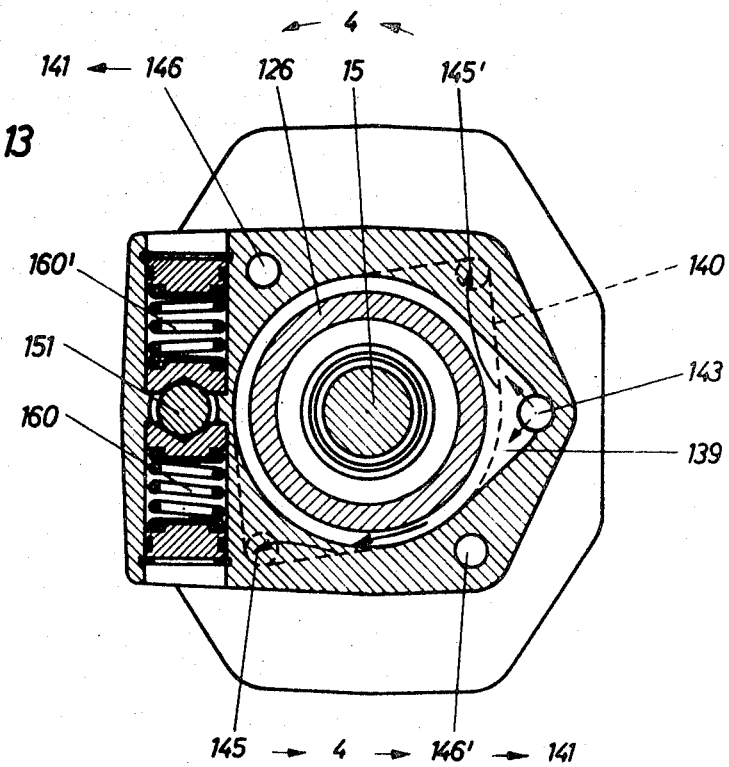
Figure 14:
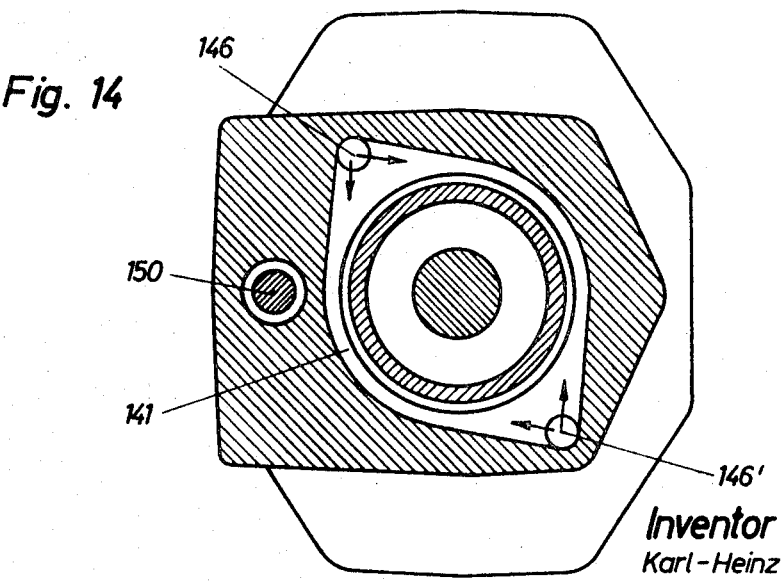

A detailed description of the invention now follows in conjunction with the appended drawing in which:

FIG. 1 is a longitudinal section through I—I of FIG. 7 of one form of the invention and showing symbolically an external engine driven pump system and a double ended servo motor cylinder in conjunction therewith;

FIG. 2 is a section through II—II of FIG. 1;
FIG. 3 is a section through III—III of FIG. 1;
FIG. 4 is a sectional detail of FIG. 1;
FIG. 5 is a section through V—V of FIG. 1;
FIG. 6 is a section through VI—VI of FIG. 1;
FIG. 7 is a section through VII—VII of FIG. 1;
FIG. 8 is a section through VIII—VIII of FIG. 1;
FIG. 9 is a section through IX—IX of FIG. 1;
FIG. 10 is a section through the metering pump along X—X of FIG. 1;
FIG. 11 is a longitudinal section through a modification of the invention wherein like reference characters indicate identical parts as shown in FIGS. 1 through 10;
FIG. 12 is a section through XII—XII of FIG. 11;
FIG. 13 is a section through XIII—XIII of FIG. 11; and
FIG. 14 is a section through XIV—XIV of FIG. 11.

Referring to the drawing and particularly the first modification, FIGS. 1 through 10, a description will first be given of the mechanical components and their moving coaction with respect to each other, to be subsequently followed by a description of the various flow control passages and their hydraulic coaction.

Referring particularly to FIG. 1, the cross section of the steering booster control unit is illustrated in conjunction with a symbolic presentation of an oil reservoir 7, a pressure pump 6, and the double ended hydraulic power cylinder 9.

The reference character 3 pertains generally to the overall assembly of all components in a housing 16 while the reference character 4 refers to a metering pump, and reference character 8 refers generally to the contol valve which compises a fixed sleeve 61 and a rotary sleeve 60.

The mechanical construction and actuation of the invention comprises the manually operable steering spindle 2 which protrudes into the housing 16 and has an integral annular or internal gear 10 at its lower end within which is a pinion 11. Reference is also made to FIG. 2 showing the radial relationship of the aforementioned components, spindle 2 and internal gear 10 being keyed together at D.

The pinion 11 is carried via a needle bearing on a crank disc 14, eccentrically mounted on and integrally carried with a shaft 15. The shaft 15 is supported in a fixed plate or housing section 34 by means of a needle bearing and extends into keyed engagement with the center gear 40 (FIG. 10) of positive flow gear pump 4 having the side gears 42 and 43. The gears of the gear pump are carried in a fixed gear housing 49 (FIGS. 1 and 10) and such pump, hereinafter referred to as a metering pump, is of generally conventional construction.

The housing 16, housing section 34, metering pump housing 49, and end cover plate 44 will be understood to be suitably secured together as by means of bolts B, as indicated on FIG. 10; the other end of the housing is closed by a cover plate C by bolts E, as indicated on FIG. 2, and provides needle bearing support means, radially and axially, for the steering spindle 2.

Referring to FIGS. 1 and 10, the shaft 15, the metering pump gear 40, and the steering spindle 2 are coaxial. Rotation of spindle 2 will effect rotation of the metering pump gear 40 via the disc 14, by effecting a crank action. Gear 10 causes rotation of pinion 11 around crank disc 14 so that pinion revolves within the gear 10, around the axis of shaft 15, but not around its own axis except, as later explained, to a limited extent for rotating valve sleeve 60.

The rate of rotation of the shaft 15 is in a ratio equal to the number of teeth of gear 10 divided by the difference between the teeth of gear 10 and the teeth of pinion 11. Accordingly, shaft 15 and thus metering pump 4 is driven at a relatively higher speed than the manual rotation of spindle 2 in order to produce a suitably heavy discharge from the metering pump to effect the purposes of the invention.

Referring to FIG. 10, the metering pump housing 49 is shown with the central gear 40 in place and meshing with the side gears 42 and 43 and it will be understood that fluid is reversibly pumped depending upon the direction of rotation of shaft 15. Thus, with the central gear rotating clockwise fluid coming in through bores 50′ and 51′ to the entering chambers 45 and 46 via bores 50 and 51 emerges via the chambers 47 and 48 to leave the metering pump via bores 52 and 53 and bores 52′ and 53′. When the rotation of gear 40 is reversed the flow directions would be reversed relative to the above description, all of which is characteristic of three-gear positive flow pumps of the kind described and diagonally opposed chambers just mentioned will hereinafter be referred to as inlet or outlet chambers, depending on flow direction, of metering pump 4.

For the purpose of rotating the valve sleeve 60 (FIGS. 1, 9 and 10) of the control valve 8, a rotative universal drive member 25 is utilized, which member takes the form of a conical sleeve provided with trunnions 23 and 24 at one end and trunnions 30 and 31 at the other end.

The trunnions 23 and 24 are housed within rotative bushings to reduce friction and wear and the bushings protrude into respective grooves 21 and 22 of a revolving ring element 20 coaxial with and revolved by pinion 11 via a claw coupling comprising fingers 28 extending into the grooves 21 and 22, (see also FIG. 3). Ring element 20 has a centering collar 27 for supporting the ring element on the pinion 11 (FIG. 4). Grooves 21 and 22 are worked out right through the length of ring element 20, and the fingers 28 of pinion 11 are adapted to mesh with a protruding portion 27' of the interior surface of ring element 20. Thus, ring element 20 revolves around the axis of shaft 15 along with pinion 11 but does not rotate around its own axis except to a limited extent permitted pinion 11, as explained hereinafter.

The rotating motion of the sleeve 25 will effect rotation of the valve sleeve 60 by virtue of trunnions 30 and 31 in their respective elongated bushings having a rotational and sliding motion in the respective slots 35 and 36 which are formed in the end skirt of the valve sleeve 60. This is a reversible rotary motion and it is limited in extent in either direction by the edges of slots 32 and 33 formed in a skirt extending inwardly from the housing section 34 (FIG. 9) and abuttable by the bushings on trunnions 30 and 31.

Sleeve 60 is thus rotative about the axis of shaft 15 up to the point where the bushings on trunnions 30 and 31 engage, simultaneously, the generally diagonally opposite walls of the respective slots 32 and 33 in the skirt extending from the fixed housing section 34.

The edges of slots 32, 33 are limit stops for rotation of valve sleeve 60, and for the duration of such rotation, in either direction, pinion 11 and ring 20 rotate on their own axis, this being a matter of a few degrees or less. However, shaft 15 can subsequently rotate to any extent permitted spindle 2 for the purpose of driving metering pump 4 during the course of steering the vehicle.

The several slots (FIG. 1) 21, 22, 32, 35, 36 are elongated to permit sufficient play for the respective trunnions as the axis of sleeve 25 revolves.

In order to bias the valve sleeve 60 to a neutral position shown in FIGS. 1, 6 to 9, U-shaped springs 66 and 67 (FIG. 9) are utilized which are made of flat material and carried in conforming grooves 62 and 64, respectively, machined in the housing 16. The legs of spring 66 are in engagement with the edges of a longitudinal slot 68 in valve sleeve 60, while the legs of spring 67 likewise engage the edges of the longitudinal slot 69 in valve sleeve 60. The legs further extend into engagement with respective longitudinal slots 63 and 65 in the fixed housing section 34. Accordingly, it will be appreciated that rotation of valve sleeve 60 in either direction will stress one leg of each of the springs by deflecting it until the limit of rotation is reached by the abutment of pins 30 and 31 with the respective edges of respective recesses 32 and 33, depending on direction of rotation of valve sleeve 60.

Release of manual torsional force on the valve sleeve 60 will permit the stressed spring legs to return the valve sleeve to the initial position shown in FIG. 7, in which position the vehicle is not being steered but proceeding straight ahead.

The springs 66 and 67 acting through valve sleeve 60 prevent pinion 11, ring 20 and sleeve 25 from rotating around their own axes until spindle 2 is rotated, at which time rotation as limited by the width of slots 30 and 31 occurs, as just explained. However, such limited rotation can occur due to road resistance to steering motion of the vehicle wheels to be steered.

Thus, as will presently appear, the flow from engine driven pump 6 passes through the metering pump 4 under control of valve sleeve 60. However, the conduits 85 and 86 communicate from the respective chambers 87 and 88 of servo cylinder 9 to metering pump 4 at all times. If that pump is not rotating, the flow from pump 6 goes through the valve without actuating the cylinder 9. However, when spindle 2 is initially rotated, it must drive shaft 15 through pinion 11 and crank disc 14. A torque is needed to effect such drive due to resistance to turning of gear 40. Such resistance is due to back pressure in a chamber of cylinder 9 effected by road resistance, rod 90 being connected to a steering mechanism (not shown). Therefore, pinion 11 will be caused to rotate around its own axis and to drive ring 20 and sleeve 25 up to the stop limits imposed by the limit edges of slots 32 and 33 (FIG. 9). Thereafter pinion 11 revolves as a crank arm around the axis of shaft 15. Thus, a cranking effect is achieved which actuates the metering pump via central gear 40 at a higher rate of speed then the rate of rotation of the steering spindle. This increased rate of speed, as previously mentioned, is in the ratio of the number of teeth of gear 10 divided by the difference between the number of teeth in gear 10 and pinion 11, and rotation continues as long as spindle 2 is rotated by the vehicle driver. The pressure produced by pump 4 is additive to that of pump 6. Further, in the event of breakdown of the pump 6 system, pump 4 can produce sufficient pressure to perform a power steering function.

The fixed valve part 61 and rotary valve sleeve 60 are provided with various grooves and passages which coact with grooves and passages in the housing for effecting flow control from the power driven pump 6 and the metering pump 4 to and from the cylinder ends of the hydraulic cylinder 9. Thus, axially spaced annular grooves 75, 76, 77, 78 and 79 are machined into the housing 16 (FIG. 1) concentric with the fixed valve sleeve 61. The groove 76 communicates with bores 50' and 51' of the metering pump (FIGS. 1 and 8). The groove 77 communicates (FIGS. 1 and 7) with bores 52' and 53'. The annular grooves 75 and 79 connect via respective conduits 85 and 86 with respective ends 87 and 88 of power cylinder 9 for the purpose of actuating piston 89 and piston rod 90 in a well known manner. On the other side the grooves 75 and 79 communicate via respective bores 101 and 102 with longitudinal grooves 93a, 93b, and 94a, 94b in the fixed part 61 of the valve unit (FIGS. 1 and 7). The high pressure conduit 80 from pump 6 connects to the groove 78.

Referring particularly to FIGS. 1 and 7, longitudinal grooves are provided in fixed sleeve 61 as follows: 92a, 92b, 93a, 93b, 94a, 94b, 95a and 95b. These grooves coact for controllable communication with longitudinal arcuate grooves in the surface of rotary valve sleeve 60 as follows: 96a, 96b,, 97a, 97b, 98a, 98b, 98c, 98d, 99a and 99b. The controllable communication is effected by rotary valve sleeve 60 in conjunction with the annular grooves 75–79, flow taking place through sets of radial bores (FIG. 7) communicating with the annular groove 78 from pump 6 such as the four radial bores 100, the two radial bores 103, etc., provided in fixed sleeve 61 and the sets being spaced axially so as to be in the planes of the respective annular grooves.

The longitudinal grooves 92a, 92b, 99a and 99b are in constant communication via the four radial bores 100 with the annular groove 78 (FIGS. 1 and 6), as mentioned. In the neutral position of valve unit 60/61 low pressure fluid from pump 6 goes through the valve unit from the annular groove 78 via bores, 100, the longitudinal grooves 99a, 99b in part 60, 95a, 95b in part 61 and longitudinal grooves 98a, 98b in part 60 of the valve unit into the return conduits 105, 107 via chamber 106. However, in any of the rotated positions of valve sleeve 60 the groove 78 is appointed to conduct high pressure fluid from pump 6 and conduit 80 via bores 100 and longitudinal grooves 92a, 92b to longitudinal grooves 96a, 96b, or 97a, 97b respectively, depending upon the rotated position of valve sleeve 60. The longitudinal grooves 93a, 93b connect with the annular groove 75 via radial bores 101 in the plane of that groove (FIGS. 1 and 7). The longitudinal grooves 94a and 94b connect with annular groove 79 via radial bores 102 in the plane of that groove. The longitudinal grooves 96a and 96b connect with annular groove 77 via radial bores 103 in the plane of that groove. The longitudinal grooves 97a and 97b connect with the annular groove 76 via radial bores 104 in the plane of that groove (FIG. 8). The longitudinal grooves 98a, 98b, 98c and 98d connect with the annular exhaust return chamber 106 (FIG. 1) via a series of bores 105. The chamber 106 is interiorly of the valve sleeve 60 and communicates with exhaust conduit 108 leading to sump tank 7 via a threaded outlet 107 from the housing 16.

In the neutral position of valve sleeve 60, as shown in the drawing (FIGS. 1, 7 and 9) the bushings for trunnions 30 and 31 are mid way between the limit edges or shoulders of respective recesses 32 and 33, maintained in such position by the springs 66 and 67. In such neutral position, pressure output from pump 6 flows to annular groove 78, via two bores 100 (vertical in FIG. 6) and longitudinal grooves 99a, 99b, 95a, 95b, 98a, 98b to the exhaust chamber 106 via bores 105, and thence to the return conduit 107, as already mentioned.

Assuming that valve sleeve 60 is rotated in the direction of the arrow A of FIG. 6, fluid pressure from pump 6 flows via conduit 80 (see also FIG. 1) to annular groove 78 and then via horizontal bores 100 and longitudinal grooves 92a, 92b in fixed sleeve 61 and thence via longitudinal grooves 96a and 96b of rotary valve sleeve 60, and via bores 103 (see FIG. 7) and annular groove 77 to bores 52' and 53' and to the inlet chambers 47 and 48 (FIG. 10) of the metering pump 4.

Pressure fluid flow is metered by pump 4 via its rotation to the outlet chambers 45 and 46 and thence via bores 50' and 51' to annular groove 76 (FIG. 8). Thereafter, pressure medium flows via bores 104 and annular grooves 97a and 97b to the longitudinal grooves 94a and 94b as well as bores 102 (see also FIG. 1) and annular groove 79, and thence via conduit 86 to cylinder chamber 88 of servo motor 9.

Cylinder chamber 87 exhausts via conduit 85, annular groove 75, bores 101, longitudinal grooves 93a and 93b, 98a and 98b (FIG. 7) to the exhaust chamber 106 (FIG. 1) and thence through conduit 108 to the tank 7.

When steering spindle 2 is rotated in a direction opposite to the arrow A shown in FIG. 7, a complete reversal of flow takes place, it being understood that, in such case, the inlet chambers of pump 4 become the outlet chambers, and the outlet chambers become the inlet chambers, while grooves 94a, 98d and 94b, 98c (FIG. 7) then carry exhaust flow instead of grooves 93a, 98a and 93b, 98b.

In the construction described the longitudinal grooves 96a, 96b, 97a, 97b, which are in the rotating valve sleeve 60, communicate, respectively, with the longitudinal grooves 93a, 93b, 94a, 94b in the fixed sleeve 61 during straight ahead steering, that is, when the sleeve 60 is in neutral position. Accordingly, in the event of shock against a vehicle wheel due to striking a bump, such shock is transmitted through the hydraulic cylinder chambers to one chamber or the other of the metering pump 4 whereupon the pump acts as a motor effecting pressure flow to counteract the shock by rotating valve sleeve 60 to send pressure flow to the cylinder chamber affected. However, the valve sleeve 60 could be designed so that its longitudinal grooves, previously mentioned, do not communicate with the longitudinal grooves of the fixed sleeve 61 as just described. In that case, a shock or impact against the vehicle wheel will be transmitted as a pressure shock through the hydraulic cylinder chambers up to the valve sleeve 60, but not therebeyond. Thus, the shock will not be felt at the steering hand wheel, when sleeve 60 is in neutral position. When the steering wheel is initially rotated, e.g. in the direction of arrow A in FIG. 7, the sleeve 60 will be rotated out of neutral position and the longitudinal grooves 94a, 94b communicate with grooves 97a, 97b, bores 104, groove 76, bores 50', 51' and pressure chambers 45 and 46 of metering pump 4. Due to action of pump 4 as a motor wheels 40, 42, 43 are accelerated in a direction opposite to their pumping movement. This opposite movement provides a reactive movement of the valve sleeve 60 so that grooves 93a and 93b more or less close and the impact on the servo motor is neutralized.

In FIGS. 11 and 13 the mechanism differs from the previously described modification in that the valve sleeve 126 of the valve sleeve arrangement 120 is reciprocal to effect a valving function although being rotated for the purpose of effecting reciprocation. Reciprocation relative to a housing section 16' is by means of a coarse thread connection. Thus, the valve sleeve carries a coarse thread 131, which engages with a coarse thread 130 in an axially extending skirt 127 of a fixed flange housing section 128 secured as by bolts F (FIG. 12) to the housing section 16'. Rotation of the valve sleeve thus effects axial motion.

Other components shown in FIGS. 11 through 13 having reference characters identical with those indicating components in FIGS. 1 through 10 are the same components. Thus, the pump gear 40, metering pump housing 49, the end cover member 44, all secured together with housing section 128 to housing section 16' having a further housing section 16" secured thereto by bolts.

The cover plate C' supports the inner end of steering spindle 2 and the drive connection components such as gear 10, pinion 11, eccentric crank disc 14 on shaft 15, and the radial and axial needle bearings, all as heretofore shown and described in connection with the previous modification are present as shown in FIG. 11. Likewise, the engine driven power pump 6, sump tank 7, double ended servo motor 9, and external conduits, are shown.

The same arrangement as in the previous modification for driving the metering pump 4 is utilized, namely, the manual operated spindle 2 acting through the gear 10, pinion 11, eccentric disc 14, shaft 15 and the pump gear 40 wherein the the eccentric disc is in actuality a crank arm on shaft 15.

Reference is made particularly to FIG. 10 wherein reference numerals are shown in parentheses to indicate the bores which pertain to FIGS. 11–14 for the identical metering pump 4.

The modified construction shows pinion 11 keyed to a disc 114 by means of a claw coupling comprising the fingers 112 and 112' diagonally disposed as shown in FIG. 12 and protruding into respective slots 113 and 113' cut through disc 114. Disc 114 also has a pair of opposed slots 115 and 115' engaged by respective claw fingers 116 and 116' integral with an oscillatory disc 118. These claws also protrude into respective slots 119 and 119' of the housing 16". Thus, oscillatory disc 118 can rotate in either direction up to the limits imposed by the longitudinal edges of slots 119 and 119' which serve as limit stops when simultaneously abutted by respective fingers 116 or 116'.

The oscillatory disc 118 is rotatively mounted on shaft 15 via a needle bearing and has a finger 125 protruding into a slot (FIG. 11) on valve sleeve 126. Accordingly, it will be understood that rotation of pinion 11 about the axis of shaft 15 will cause rotation of the disc 114 and disc 118 and thus rotate the valve sleeve within the limits imposed by the spacing of the edges of grooves 119 and 119', in either direction.

Such rotation of valve sleeve 126 effects, by virtue of the coarse thread coaction, a reciprocation against the compressive force of a compression spring S which is interposed via washers between a ledge 161 and a circlip 162 of the valve sleeve, and the skirt 127 and the skirt 163 of disc 118, which disc will be understood to be axially fixed against housing 16" by ring 114, gear 10 and cover C', although relative rotation of disc 118 is maintained.

Spring S maintains a stabilizing force on valve sleeve 126 so that it can be accurately set to neutral position.

The disc 114 (FIG. 12) is, in effect, a universal joint member permitting pinion 11 to revolve around the axis of shaft 15 and to a limited extent around its own axis. Several features of disc 114 and housing 16″ serve this purpose, such as: elongated bore 164; slots 113, 113′ and 115, 115′ elongated and in a cross array; a crescent of material removed on each side of disc 114 permitting, along with the elongation of slots 115 and 115′, the lateral motion of disc 114; slots 119 and 119′ larger than fingers 116 and 116′ of disc 118. When fingers 116, 116′ abut the edges of respective slots 119, 119′ the disc 114 (and valve 126) can no longer rotate. Due to the fingers 112, 112′ of pinion gear 11 protruding into slots 113, 113′, the pinion gear is restrained from rotating about its own axis and then revolves bodily about the axis of shaft 15. Thus, the effect is the same as that produced by sleeve 25 in FIGS. 1–10.

The neutral position of the valve sleeve for straight ahead position is further maintained by a ball ended lever having a universal motion connection 150 as shown in FIG. 11 in a socket formed in the housing. Ball end 151 is intermediate a pair of compression springs 160 and 160′ (FIG. 13), the other end of the lever having a ball end 152 within a slot of disc 118. Since the outer ends of springs 160 and 160′ are fixed, it will be apparent that the springs maintain disc 118 in a neutral position. If the disc is rotated away from that position, the springs will return it when rotative force has ceased.

Inasmuch as the control grooves, e.g., 139, of the valve of the housing 16′ are all peripheral, as are those of valve sleeve 126, there will be no flow control effect by virtue of rotation of valve sleeve 126, only reciprocal motion will have a flow control effect.

The threaded sections of the housing and valve sleeve are designed with a sufficient tooth bottom clearance to permit flow therethrough.

From consideration of FIG. 11 it will be apparent that in neutral position of valve sleeve 126 pressure medium flows from pump 6 entering around the valve sleeve through the housing groove K and through ports L in sleeve 126, thence interiorly of the valve sleeve 126 via threads 130 and 131, through apertures (not shown) in the washers at the ends of the spring S, thence through bores M and groove N to sump 7. Bores L and M and the other bores shown in valve sleeve 126 may be provided in any desired plurality in respective planes.

When spindle 2 is rotated in a direction such that valve sleeve 126 is axially shifted, say downwards (FIG. 11), circulatory flow from pump 6 will be interrupted at grooves 133 and 134 in the housing and in the valve sleeve by means of the ring 138 on the valve sleeve. Fluid pressure then flows from housing groove K via bore 143 closed by a ball 164 and groove 139 (see also FIG. 13) to the sleeve groove 141 (FIG. 14). Groove 141 communicates with the longitudinal bores 146 and 146′. The diagonally opposed bores are either inlet or outlet for pump 4 (FIG. 10), depending upon the direction of flow, as heretofore explained. Bores 146 and 146′ communicating with chambers 45 and 46 of pump 4, which in the present case are inlet chambers, flow then proceeds from the outlet chambers 47 and 48 of the metering pump through axial bores 145 and 145′ (FIG. 13, dotted lines) communicating with the sleeve groove 140, and thence to the housing groove 148 for flow via conduit 85 to chamber 87 of the servo motor 9. Exhaust from cylinder chamber 88 flows via conduit 86, grooves 149 and N, and bores M to sump 7.

The valve sleeve grooves and rings are symmetrical as are the housing rings and grooves as shown in FIG. 11. Accordingly, upwards movement of the valve sleeve will pressurize chamber 88 and exhaust chamber 87.

When manual force is released from the steering spindle the springs 160 and 161′ return valve sleeve 126 to position shown in FIG. 11, as hereinabove explained.

The modification shown in FIGS. 11 through 14 is designed with the rings positioned opposite to grooves 148 and 149 respectively, being smaller than grooves 148 and 149 as shown, so that in the event of impact against the vehicle wheel when the valve sleeve is in neutral position the reaction will cause motor operation of metering pump 4 to overcome the shock. Likewise, the arrangement can be designed with said rings having equal or greater width than grooves 148 and 149, so that the shock is absorbed as an increase in pressure in the conduits 85 or 86.

I claim:

1. In a booster steering system for motor vehicles, a valve, a metering pump, a rotative shaft connected to actuate said metering pump, a steering spindle, valve actuating means comprising a drive connection means between said steering spindle and said shaft wherein said drive connection includes an internal gear and a pinion gear, said internal gear being connected to be rotated by said spindle, said pinion gear being disposed in said internal gear and meshing therewith, a crank member on said shaft and carrying said pinion gear wherein said pinion gear has relative rotation with respect to said crank member for actuating said valve and wherein rotation of said spindle is operative to bodily revolve said pinion gear about the axis of said shaft, when said pinion gear is not relatively rotative, for driving said crank member to effect rotation of said shaft at a rate greater than the rate of rotation of said steering spindle, and valve motion limiting means whereby initial rotation of said steering spindle actuates said valve to a limit of actuation and subsequent rotation of said steering spindle effects rotation of said shaft.

2. In a system as set forth in claim 1, said crank member comprising a disc eccentrically mounted on said shaft; said valve comprising a rotative valve sleeve encompassing said shaft; and said valve actuating means comprising a universal joint member encompassing said shaft and connecting to said valve sleeve and to said pinion gear and actuated responsive to said initial rotation of said steering spindle to rotate said valve sleeve, said pinion gear being thus rotative on its own axis to rotate said universal joint member until said valve sleeve reaches a predetermined extent of rotation.

3. In a system as set forth in claim 2, means for connecting said universal joint member to said pinion gear comprising trunnion means carried by said universal joint member at one end, a ring coaxial with said pinion gear and connected to rotate therewith about the axis of said pinion gear and to revolve therewith around said shaft axis; said ring having slot means into which said trunnion means slidably protrudes; trunnion means at the other end of said universal joint member and slot means carried by said valve sleeve into which said trunnions slidably protrude; and motion limiting means comprising slot means coacting with said latter trunnion means to effect limits of rotary motion of said valve sleeve in either direction.

4. In a system as set forth in claim 3, and biasing means for maintaining a neutral position of said valve sleeve comprising springs engaging said valve sleeve whereby rotation thereof stresses said springs.

5. A system as set forth in claim 3, including a housing, said valve sleeve, said universal joint member and said shaft being within said housing, said valve sleeve having an extending skirt provided with slot means, said housing having a skirt internally of said valve skirt and provided with slot means, the trunnion means at the other end of said universal joint member protruding into the slot means of said valve sleeve and through the slot means of said housing skirt, and having free play in either direction of rotation with said housing skirt slot means to a predetermined extent for limiting rotative motion of said valve sleeve.

6. In a system as set forth in claim 2, said universal joint member comprising a conical sleeve having a larger end provided with a torque transmitting slidable connection with said pinion gear and its smaller end having a torque transmitting slidable connection with said valve sleeve.

7. A system as set forth in claim 6, said valve actuating means comprising a ring member keyed to said pinion gear and coaxial therewith and having a pair of diametrically opposed grooves, said conical sleeve having trunnions protruding slidably into respective grooves, wherein said trunnions and grooves effect said connection means with said pinion gear, said grooves and trunnions being in a diametrical plane of said valve sleeve.

8. A system as set forth in claim 2, a housing for said valve sleeve, and means for effecting a neutral position of said valve sleeve comprising at least one U-shaped spring carried by said housing and having a pair of spaced legs extending through said valve sleeve so that a respective leg is stressed when said valve sleeve is rotated in one direction or the other.

9. In a system as set forth in claim 1, said valve comprising a rotary valve sleeve, and universal joint means comprising a conical sleeve encompassing said shaft and having torque transmitting connection means with said pinion gear and with said valve sleeve for actuating said valve sleeve, said connection means being operative to permit a sliding freedom of motion of said conical sleeve with respect to said pinion gear and with respect to said valve sleeve in the plane of said shaft.

10. In a system as set forth in claim 1, including a housing, said valve, said shaft and said drive connection means being within said housing, said steering spindle having a portion entering said housing at one end thereof, said metering pump being secured at the other end thereof; said valve comprising a sleeve within said housing and fixed thereto and having radial bores, said housing having annular internal grooves in the planes of respective bores, said valve further comprising a rotary valve sleeve having longitudinal grooves whereby rotation of said valve sleeve selectively aligns longitudinal grooves thereof with longitudinal grooves of said fixed sleeve, means providing flow communication between said metering pump and said valve and means providing for connection from said valve housing to an engine driven pump and to a servo motor.

11. In a booster steering system as set forth in claim 1, including a housing; said valve and said drive connection means being within said housing, said valve comprising a movable valve sleeve having annular grooves and further comprising a plurality of annular grooves in said housing for flow control coaction with said valve sleeve grooves and means for reciprocating said valve sleeve responsive to rotation thereof for effecting selective flow communication coaction.

12. In a system as set forth in claim 11, including means for maintaining said valve sleeve in a neutral position comprising a lever rockably carried by said housing and having an end pivotally connected with said valve sleeve and means for biasing said lever to a position to maintain said valve sleeve in a neutral position.

13. In a system as set forth in claim 11, including a compression spring disposed to apply a yieldable force to said valve sleeve, a coarse threaded connection between said valve sleeve and said housing whereby rotation of said valve sleeve effects reciprocation thereof; and flow connection means between said metering pump and said valve including said coarse threaded connection for communicating flow with said valve.

14. In a system as set forth in claim 1, said valve comprising a rotative valve sleeve, said drive connection means including a universal coupling member mounted for rotation about the axis of said shaft and coupled to said pinion gear and operative to permit said pinion gear to revolve bodily about the axis of said shaft while in conjunction with said motion limiting means preventing rotation of said pinion gear about its own axis, and an oscillatory rotative member intermediate said universal joint member and said valve sleeve for rotation thereof.

15. In a system as set forth in claim 14, said oscillatory rotative member comprising a disc, biasing means connected therewith for biasing said disc to an initial neutral position whereby said valve sleeve is biased to an initial neutral position.

16. In a system as set forth in claim 14, including a housing for said valve sleeve and having recess means, finger means carried by said rotative member for protruding into said recess means and having free rotary play therein to a predetermined extent to limit rotative motion of said rotative valve sleeve; and means intermediate said valve sleeve and said housing effecting reciprocation of said valve sleeve responsive to rotation thereof.

17. In a system as set forth in claim 16, including coarse-threaded screw and nut means on said valve sleeve and said housing effecting reciprocation of said valve sleeve responsive to rotation thereof.

18. In a booster system as set forth in claim 1, including flow communication means between said metering pump and said valve wherein said valve is operative to central flow therethrough to a servomotor.

19. In a system as set forth in claim 1, said valve comprising a rotative valve sleeve, said drive connection means including a universal coupling member mounted for rotation about the axis of said shaft and coupled to said pinion gear and operative to permit said pinion gear to revolve bodily about the axis of said shaft while preventing rotation in conjunction with said motion limiting means about its own axis.

References Cited

UNITED STATES PATENTS

| 3,059,717 | 10/1962 | Moyer et al. | 180—79.2 |
| 3,092,083 | 6/1963 | Sheppard | 180—79.2 X |
| 3,360,932 | 1/1968 | Lech et al. | |
| 3,385,057 | 5/1968 | Pruvot et al. | 180—79.2 X |

LEONARD H. GERIN, Primary Examiner

U.S. Cl. X.R.

60—52; 91—375; 180—79.2